United States Patent
Starzmann et al.

(10) Patent No.: US 7,942,463 B2
(45) Date of Patent: May 17, 2011

(54) REAR-WINDOW ROLLER BLIND WITH BACK-SEAT SHELF AS A SUPPORT ELEMENT

(75) Inventors: Michael Starzmann, Hohengehren (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 344 days.

(21) Appl. No.: 12/123,197

(22) Filed: May 19, 2008

(65) Prior Publication Data

US 2008/0289776 A1 Nov. 27, 2008

(30) Foreign Application Priority Data

May 21, 2007 (DE) .......................... 10 2007 023 810

(51) Int. Cl.
*B60J 3/02* (2006.01)
(52) U.S. Cl. .................... 296/143; 296/97.1; 296/97.11; 160/370.22; 52/573.1
(58) Field of Classification Search ................. 296/97.1, 296/97.7, 97.8, 97.9, 97.11, 97.12, 143; 160/370.22, 160/265, 274, DIG. 3; 52/573.1
See application file for complete search history.

(56) References Cited

U.S. PATENT DOCUMENTS

| | | | | |
|---|---|---|---|---|
| 4,758,041 A * | 7/1988 | Labeur | ........................... | 296/152 |
| 6,520,239 B2 * | 2/2003 | Schlecht et al. | ............. | 160/120 |
| 6,547,307 B2 * | 4/2003 | Schlecht et al. | ............. | 296/97.4 |
| 6,598,929 B2 * | 7/2003 | Schlecht et al. | ............. | 296/97.4 |
| 6,668,902 B2 * | 12/2003 | Bong | ....................... | 160/370.22 |
| 6,695,381 B2 * | 2/2004 | Schlecht et al. | ............. | 296/97.4 |
| 6,739,375 B2 * | 5/2004 | Schlecht et al. | ......... | 160/370.22 |
| 6,796,599 B2 * | 9/2004 | Schlecht et al. | ............. | 296/143 |
| 6,834,705 B2 * | 12/2004 | Seel | ......................... | 160/370.22 |
| 6,840,562 B2 * | 1/2005 | Schlecht et al. | ............. | 296/97.9 |
| 6,848,493 B1 * | 2/2005 | Hansen et al. | ........... | 160/370.22 |
| 7,316,443 B2 * | 1/2008 | Schlecht | ....................... | 296/97.8 |
| 7,396,067 B2 * | 7/2008 | Thumm et al. | ................. | 296/143 |
| 7,661,455 B2 * | 2/2010 | Weinbrenner | ........... | 160/370.22 |
| 7,686,375 B1 * | 3/2010 | Schlotterer et al. | ........ | 296/97.8 |
| 2002/0074824 A1 * | 6/2002 | Schlecht et al. | ............. | 296/143 |
| 2006/0219372 A1 * | 10/2006 | Hansen | ..................... | 160/370.22 |
| 2007/0051475 A1 | 3/2007 | Wieczorek | | |
| 2007/0144689 A1 * | 6/2007 | Walter et al. | ............. | 160/370.22 |

FOREIGN PATENT DOCUMENTS

DE 3936652 A1 5/1991

(Continued)

OTHER PUBLICATIONS

N. Gogusch, Modul IV, Teil 1, TUV-Akademie, 2005.

*Primary Examiner* — Glenn Dayoan
*Assistant Examiner* — Gregory Blankenship
(74) *Attorney, Agent, or Firm* — Leydig, Voit & Mayer, Ltd.

(57) ABSTRACT

In a rear-window roller blind for motor vehicles in which a rear half of a back-seat shelf, which is located between the rear window and the pull-out slot for the rear-window roller blind, is used as a support element for the roller blind. The back-seat shelf half is made either from a wood material or is a plastic molded part. Through alternative arrangements, it is ensured that the temperature expansion and contraction of the components of the roller blind and its support are accommodated.

26 Claims, 8 Drawing Sheets

FOREIGN PATENT DOCUMENTS

| | | |
|---|---|---|
| DE | 19934198 A1 | 3/2001 |
| DE | 10231626 A1 | 2/2004 |
| DE | 102004020931 A1 | 12/2005 |
| DE | 102006000879 A1 | 3/2007 |
| EP | 1666291 A2 | 12/2001 |
| EP | 1775164 A1 | 10/2005 |
| EP | 1724137 A1 | 3/2006 |
| EP | 1782979 A2 | 7/2006 |

* cited by examiner

REAR-WINDOW ROLLER BLIND WITH BACK-SEAT SHELF AS A SUPPORT ELEMENT

FIELD OF THE INVENTION

This present invention relates generally to roller blinds, and more particularly, to motor driven roller blinds used for the rear windows of motor vehicles.

BACKGROUND OF THE INVENTION

In order to reduce the build-up of heat in the interior of passenger cars from solar radiation and thus to reduce the burden on the air-conditioning system, rear-window roller blinds frequently are used. They also protect the passengers sitting in the back seat from direct solar radiation.

Such rear-window roller blinds basically consist of a wind-up shaft to which one edge of a roll-up shade is attached. The end of the roll-up shade away from the wind-up shaft is attached to a pull rod. In such construction the ends of the pull rod are guided in guide rails which are securely anchored in the car body. The guide rails can be located in the region of the side lining of C-pillars of the vehicles or in a gap between the rear window and the pillar lining.

The wind-up shaft is arranged underneath the back-seat shelf. It is typically supported in a separate housing or on a separate frame, which is mounted into the car body. Because the run-out slot for the shade divides the back-seat shelf into two parts, frequently the frame also is used as a support element for at least one part of the back-seat shelf.

OBJECTS AND SUMMARY OF THE INVENTION

It is an object of the present invention to provide a novel rear-window roller blind that is relatively simple in design, less expensive to manufacture, and more stable in operation.

According to one solution approach, that part of the back-seat shelf located between the rear window and the pull-out slot is made from a non-metallic material whose coefficient of expansion is approximately equal to that of steel. Therefore, this part of the back-seat shelf can be used directly as a support element on which bearing devices for the wind-up shaft are attached. Neither the steel car body nor the wind-up shaft, also typically made from steel, significantly change their size in the temperature range involved because their temperature coefficient is relatively small. Because the back-seat shelf halves have nearly the same temperature coefficients, the bearing ratios for the wind-up shaft remain the same.

The novel roll-up shade further includes a roll-up shade which is attached to the wind-up shaft with one edge and whose edge away from the wind-up shaft is provided with a pull rod. The pull rod has slides on its ends, which slide in guide rails fixed to the car body. The drive is effected with linear push elements, which are similarly guided in the guide rails protected from buckling. They are driven with the aid of a gear motor, which is attached to the back-seat shelf used as the support element.

Biasing of the roll-up shade is effected with the aid of a spring motor coupled to the wind-up shaft, which biases the shaft in the direction of winding the roll-up shade. A person skilled in the art will appreciate that the gear motor and the spring motor can also trade places. That is, the wind-up shaft can be driven by means of the geared motor, while the spring motor actuates the push elements.

The unit constructed in this way can be inserted as a whole into the vehicle, with which, on the one hand, a significant part of the rear-window roller blind is mounted and simultaneously also the back-seat shelf is installed. The separate assembly of the rear-window roller blind and back-seat shelf on an assembly belt is eliminated by the vehicle manufacturer. In addition, weight is saved as well as additional parts.

The material for the back-seat shelf half can be a wood material, which is preferably assembled from wood fibers or wood chips joined together with a bonding agent. The back-seat shelf can be a press-formed part, on which additional raised sections and recesses are formed which permit a simple attachment of the bearing device. A bonding agent can be lignin or an artificial resin.

To further simplify assembly, each bearing device can be provided with a tubular coupling piece designed for connecting it to a corresponding guide rail and in which the slide is guided. Each guide rail can be mounted individually in the car body. The guide rail can be a plastic molded part or a metal molded part, for example, an aluminum extrusion-molded part.

For each push element, preferably there is one guide tube extending between the gear motor and the coupling piece for the guide rail. Furthermore, a storage tube can be provided for each push element. At least the storage tube can be formed from grooves integrally formed in the carrier element.

According to a second solution approach, the back-seat shelf half consists of a plastic injection-molded part, which has a large temperature coefficient relative to steel. At a corresponding temperature of approximately 60° C., the back-seat shelf half can be longer by about 10 mm than the wind-up shaft. Such a length difference is significant and can lead to problems without countermeasures. According to the invention, for this purpose, bearing devices, which are attached to the carrier element in a movable way, are provided for the wind-up shaft. With the aid of spacing means, the bearing devices are held at the correct distance as a function of temperature. Here, the spacing means naturally have a temperature profile that is at least very similar, preferably equal, to the temperature profile of the car body or wind-up shaft. The function of the back-seat shelf half as a carrier element and as a base frame, as it were, for the construction of the roller blind device is nevertheless maintained.

Between the bearing devices, the wind-up shaft is supported on one end. In the typical way, the roll-up shade is attached with one edge to the wind-up shaft and its other edge away from the wind-up shaft is connected to a pull rod. On one side, the pull rod carries slides, which run in two guide rails attached in the vehicle. The guide rails begin at the back-seat shelf and are also used to guide linear push elements in a way that is protected from buckling.

By means of a spring motor, the wind-up shaft is biased in the direction of winding up the roll-up shade. The outward movement of the pull rod takes place by means of push elements, which are driven by a gear motor.

For someone skilled in the art, it is clear that the gear motor and the spring motor can also trade places. That is, the drive of the wind-up shaft takes place via the gear motor, while the spring motor actuates the push elements.

Each bearing device can be provided with a tubular coupling piece designed for connecting it to the corresponding guide rail and in which the slide is guided. In this way, the assembly is simplified, because a flush connection is necessarily produced by means of the coupling piece, and the pull rod is also held properly before the assembly of the arrangement in the vehicle.

Each guide rail can be mounted individually in the car body. The guide rail can be a plastic molded part; it can also be made from metal, for example, an aluminum extrusion-molded part.

To prevent buckling of the push elements between the gear motor and guide rail, guide tubes are provided, which extend up to the coupling piece or the guide rail. The guide tube can preferably be resiliently flexible, at least in some sections.

For each push element, a storage tube can extend from the gear motor. The storage tube can be resistant to flexing, for example, by producing it from metal. If the storage tube is rigidly connected to the adjacent bearing device on its end away from the gear motor, the storage tube can simultaneously form the spacing means.

Another possibility for the spacing means consists of the car body itself. Here, the bearing devices are mounted for shifting movement on the back-seat shelf half by connection means that connect the bearing device to the car body. These connection means can be formed by the coupling device and the corresponding guide rail. Another possibility consists of using pegs and eyes, wherein, for example, the pin is provided on the bearing device and the eye is provided on the car body.

To prevent unsightly side gaps or if the storage tubes are used as spacing means, it is useful if the back-seat shelf half has a centering device, preferably a pin, which engage in a corresponding opening in the car body, approximately at the center of its longitudinal extent, i.e., at the height of the middle of the wind-up shaft. Therefore, the center of the back-seat shelf half is fixed relative to the width of the vehicle. For changes in temperature, the change in length thus acts on both sides of the back-seat shelf half, which prevents a large gap from occurring on one side under some circumstances, while no gap would exist between the side lining and the back-seat shelf on the other side.

The carrier element produced as a plastic molded part in the construction of the back-seat shelf half can be provided on the bottom side with ribs which border hexagonal cells, producing a honeycomb configuration.

At least for the storage tubes, grooves running in the longitudinal direction can be formed in the bottom side of the back-seat shelf half. These grooves form storage tubes for the push elements together with an elongated cover that can be locked in these grooves. In this way, the assembly is considerably simplified, because the complicated attachment and repositioning of the storage tubes is eliminated.

According to a third solution approach, the rear-window roller blind has a carrier element, which is formed by the back-seat shelf half and extends between the pull-out slot and the rear window. The back-seat shelf half is formed as a plastic molded part with a different expansion coefficient than the wind-up shaft or the car body which are made from steel. Bearing devices are attached rigidly and immovably to this back-seat shelf half, which is used as a base frame for the construction of the rear-window roller blind. Between these bearing devices, the wind-up shaft is floatingly supported in the axial direction. With the aid of elastic compensation means, the roll-up shaft is centered between the bearing devices.

The roller blind further includes two guide rails, which are attached in the vehicle and which begin at the back-seat shelf. In the guide rails run slides, which are attached to the ends of the pull rod. Furthermore, the guide rails are used for guiding linear push elements so that they are protected from buckling.

A spring motor is coupled to the wind-up shaft in order to bias the wind-up shaft in the direction of winding up the roll-up shade onto the wind-up shaft. By means of a gear motor, which is attached to the carrier element in the construction of the back-seat shelf half, the two linear push elements are set in motion in sync and in opposite directions, when the roll-up shade is extended or retracted.

Again, a person skilled in the art will appreciate that the gear motor and the spring motor can also trade places. That is, the drive of the wind-up shaft takes place via the gear motor, while the spring motor actuates the push elements.

The assembly is simplified if each bearing device is provided with a coupling piece, which already holds the slide of the pull rod in the preassembled state.

Each guide rail is mounted individually in the car body. The guide rail can be a plastic molded part or a metal molded part. In both cases, it is useful if the section of the guide rail adjacent to the wind-up shaft is resiliently flexible in order to be able to permit a sideward motion when the bearing devices move transverse to the vehicle due to the expansion in length of the back-seat shelf half.

For each push element, a guide tube can be provided which is connected to the coupling piece or the guide rail by means of an elastic intermediate part.

Preferably, the back-seat shelf half is attached to the car body approximately in the middle region by a centering means so that the difference in length when the vehicle heats up or cools down is distributed uniformly on both ends of the back-seat shelf half. So that the self-centering of the wind-up shaft between bearing devices moving away from or toward each other as a result of the temperature profile is not negatively affected, the spring motor is connected via a coupling, which transfers merely torque.

As elastic compensation means, two springs can be provided, which are located in front of corresponding ends of the wind-up shaft and which center the wind-up shaft between the bearing devices. These springs can preferably be helical compression springs or, for example, a disk spring package.

In the bottom side of the back-seat shelf half, there can be grooves to which covers are assigned and which form, together with the cover, a storage tube for the slack belt strand of each push element. Furthermore, for reinforcement, ribs that border hexagonal cells similar to a honeycomb structure can be provided on the bottom side.

Other objects and advantages of the invention will become apparent upon reading the following detailed description and upon reference to the drawings, in which:

Figure 1:
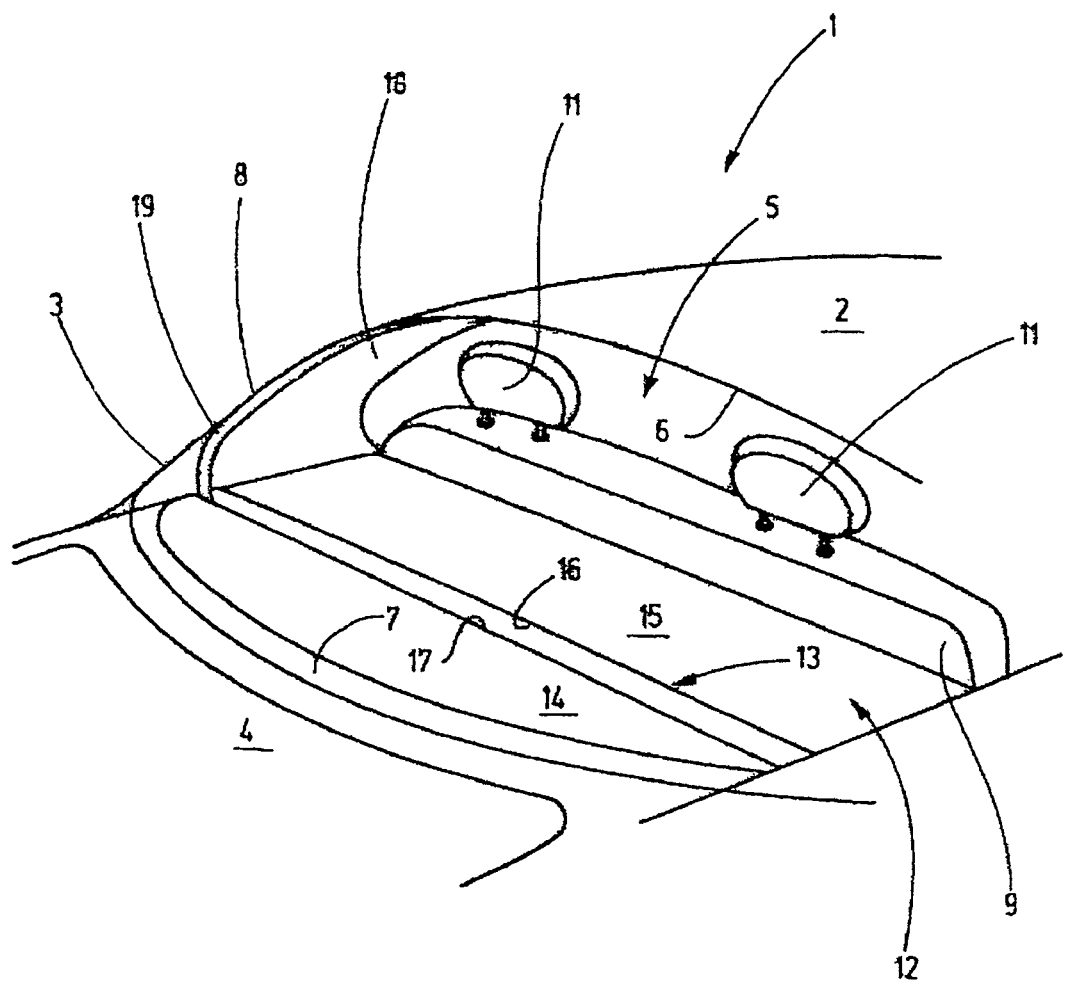
FIG. 1 is a fragmentary perspective of a motor vehicles having a rear window roller blind in accordance with the invention, shown in a retracted position.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention. It further will be understood that the drawings are not absolutely true to scale. For illustrating details, certain regions may possibly have been shown excessively large. In addition, the drawings are simplified and do not contain each detail possibly present in the actual construction. The terms "top" and "bottom" or "front" and "back" relate to the normal installation position or terminology for motor vehicles.

DESCRIPTION OF THE PREFERRED EMBODIMENTS

Referring now more particularly to FIG. 1 of the drawings, there is shown an illustrative motor vehicle having a rear window roller blind mounting arrangement in accordance with the invention. FIG. 1 depicts a view of a cut-out of the rear section of a motor vehicle 1 having a roof 2, a left C-pillar 3, and a trunk cover 4. The right C-pillar corresponding to the left C-pillar 3 is cut away and thus not visible. Above the trunk cover 4, the vehicle includes a rear window 5, which is bordered by a top edge 6, a bottom edge 7, and also two side edges, of which only the side edge 8 as a component of the C-pillar 3 is shown due to the cut-away representation.

In the interior of the motor vehicle 1, a back-seat backrest 9 with headrests 11 standing on the backrest is visible. Between the rear side of the backrest 9 and the bottom edge 7 extends a back-seat shelf 12, which is divided by a pull-out slot 13 into two back-seat shelf halves 14, 15. The slot 13 is bordered by two parallel slot edges 16, 17 that extend across the entire width of the back-seat shelf 12. In the practical embodiment, the pull-out slot 13 is covered by a pull-out profile, which in this case is left out for reasons of clarity.

On the inside of the C-pillar 3, an inner line 18 is to be seen, which contains a guide rail 19, which begins underneath the slot 13 in the back-seat shelf 12 and from there follows the profile of the side edge 3 up to the top edge 6.

Figure 2:
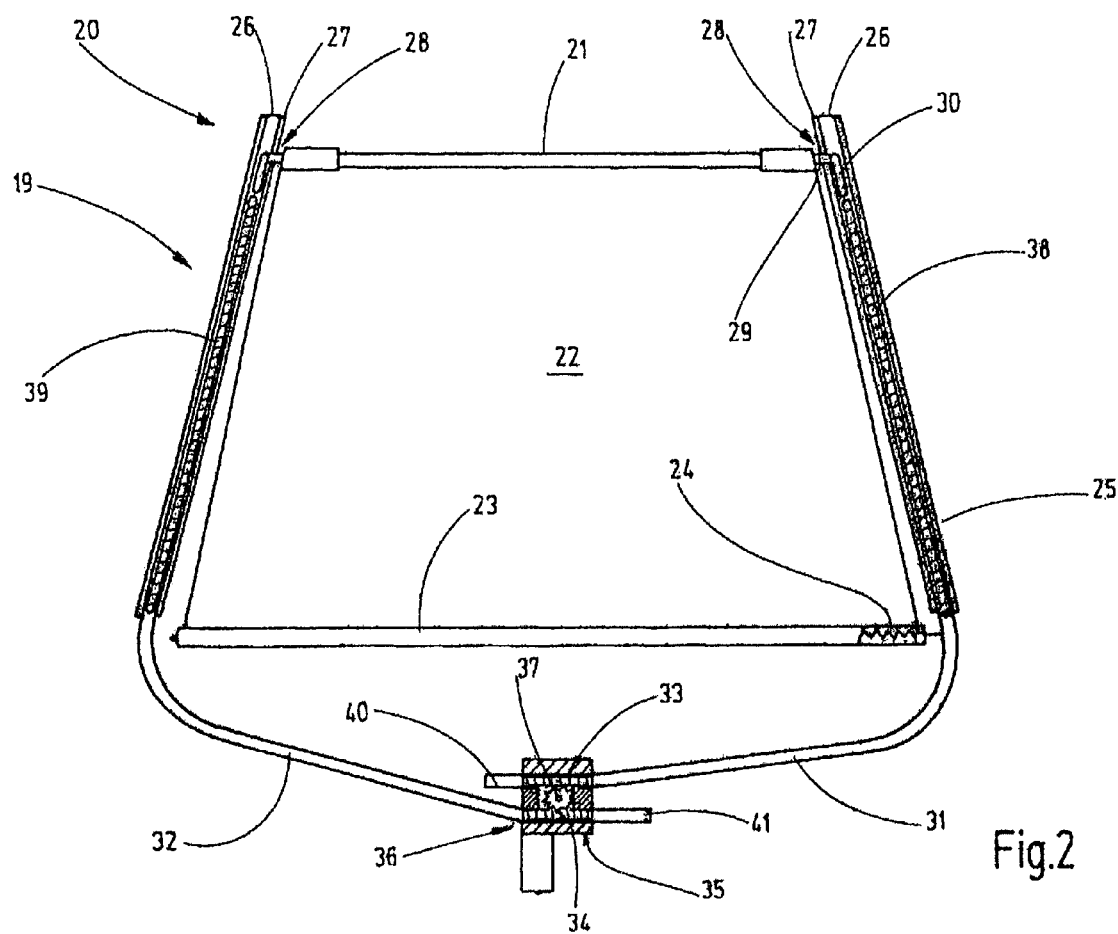
FIG. 2 is a schematic depiction of the illustrated rear window roller blind and its drive.

Underneath the back-seat shelf 12 there is a rear-window roller blind 20, as depicted in FIG. 2. The rear-window roller blind 20 includes the already mentioned pull-out profile or rod 21 to which a roll-up shade 22 is attached at one edge. The other edge of the roll-up shade 22 is connected to a tubular roll-up shaft 23, which is supported on one end underneath the back-seat shelf half 14 for rotation, Within the wind-up shaft 23 there is a spring motor 24, by means of which the wind-up shaft 23 is biased in the direction of winding up the roll-up shade 22 onto the wind-up shaft 23. The spring motor 24 is connected on one end to the wind-up shaft 23 and fixed on the other end to a corresponding car body structure.

The pull-out profile 21 is guided on one end in the guide rail 19 visible in FIG. 1 and on its opposite end in the guide rail 25 contained in the cut-away C-pillar. The two guide rails 16, 25 are aligned with each other and lie in a common plane, whose generatrix is a straight line. In FIG. 2, the two guide rails 16, 25 are shown elongated, but in practice they follow, at least approximately, the profile of the side edge of the rear window 5.

Each guide rail 19, 25 has a guide groove defined by a groove chamber 26 and a groove slot 27. The width of the groove chamber 26 is greater than the width of the groove slot 27 so that an undercut guide groove is produced.

The pull-out profile 21 has corresponding guide pieces 28, that project into the corresponding guide rails 16, 25. Each guide piece 28 is composed of a throat part 29 and a slide 30 which is adapted in cross section to the cross section of the groove chamber 26. The throat part 29 is smaller in thickness so that it passes through the groove slot 27.

Stiff guide tubes 31, 32 which, each connect a corresponding groove chamber 26 to an associated borehole 33, 34 in a gear housing 35, connect to the bottom end of the two guide rails 19, 25. The gear housing 35 is a part of a gear motor 36 having an output shaft with a gear wheel 37 fixed thereon. By means of the gear wheel 37, two resiliently flexible linear push elements 38, 39 are driven with a positive fit. The two push elements 38, 39 have the form of a toothed rack with a circular cross section and helical, circumferential teeth. Their pitch corresponds to the pitch of the output gear wheel 37. Because the two push elements 38, 39 are on diametrically opposite sides of the output gear wheel 37, they are pushed or retracted in the opposite direction at the same speed when the gear motor 36 is operated. Storage tubes that hold the slack portions of the corresponding push elements 38, 39, are indicated by 40, 41.

For extending the rear-window roller blind 20 shown in the figures, the gear motor 36 is operated corresponding drive wheel rotation by means of which the push elements 38, 39 moved in the direction toward the top end of the guide rails 19, 25. Here, they push the slides 30 of the pull-out profile 21 in front of themselves. Therefore, the pull-out profile 21 moves in the direction toward the top edge 6 of the rear window 5 by means of which the roll-up shade 22 is simultaneously pulled from the wind-up shaft 23. The spring motor 34 acting in the opposite direction keeps the roll-up shade 22 in tension.

For retracting the roll-up shade 22, the geared motor 35 is operated in the opposite direction of rotation. In this way, the push elements 38, 39 are retracted from the guide rails 19, 25 downward in the direction toward the wind-up shaft 23. The spring motor 24 contained in the wind-up shaft 23 winds up the roll-up shade 22 onto the wind-up shaft 23 accordingly, as far as the position of the push elements 38, 39 permits.

When the pull-out profile or rod 21 moves along the guide rails 19, 25, its effective length changes, in that the throat parts 29 are pulled out or pushed back into the middle part of the pull-out profile. In this way, the changing lateral width of the guide rail 19, 25 is equalized.

As indicated above, in keeping with the invention, the rear half of the back-seat shelf serves a supporting structural element for the roller blind 20. The back-seat shelf half 14 thus forms the shell or frame on which the roller blind 20 is built, i.e., the back-seat shelf half 14 is itself a component of the roller blind 20.

Initial conditions must be taken into consideration. The wind-up shaft of the roller blind typically is made of steel for reasons of strength and cost. Relatively small temperature-dependent changes in length in the temperature range of interest between approximately −20° and +70° C. are like those that can occur in motor vehicles. The change in length of the wind-up shaft made from steel thus essentially corresponds to the change in shape exhibited by the car body similarly made from sheet steel. Both have the same relative coefficient of temperature expansion. Because they have the same dimensions at the height of the back-seat shelf, the changes in length are also equal.

The material of the back-seat shelf itself typically cannot be metal for various reasons, including cost, weight, production complexity, and the like. Therefore, measures must be sought to adapt the non-metallic back-seat shelf to the change in length of the wind-up shaft or car body occurring in the temperature range of interest. Indeed, the back-seat shelf half has a considerable length of more than 1200 mm corresponding to the width of the vehicle, which leads to a difference in length, for example, relative to the wind-up shaft, of greater than 10 mm when plastic material is used for the back-seat shelf half.

Figure 3:
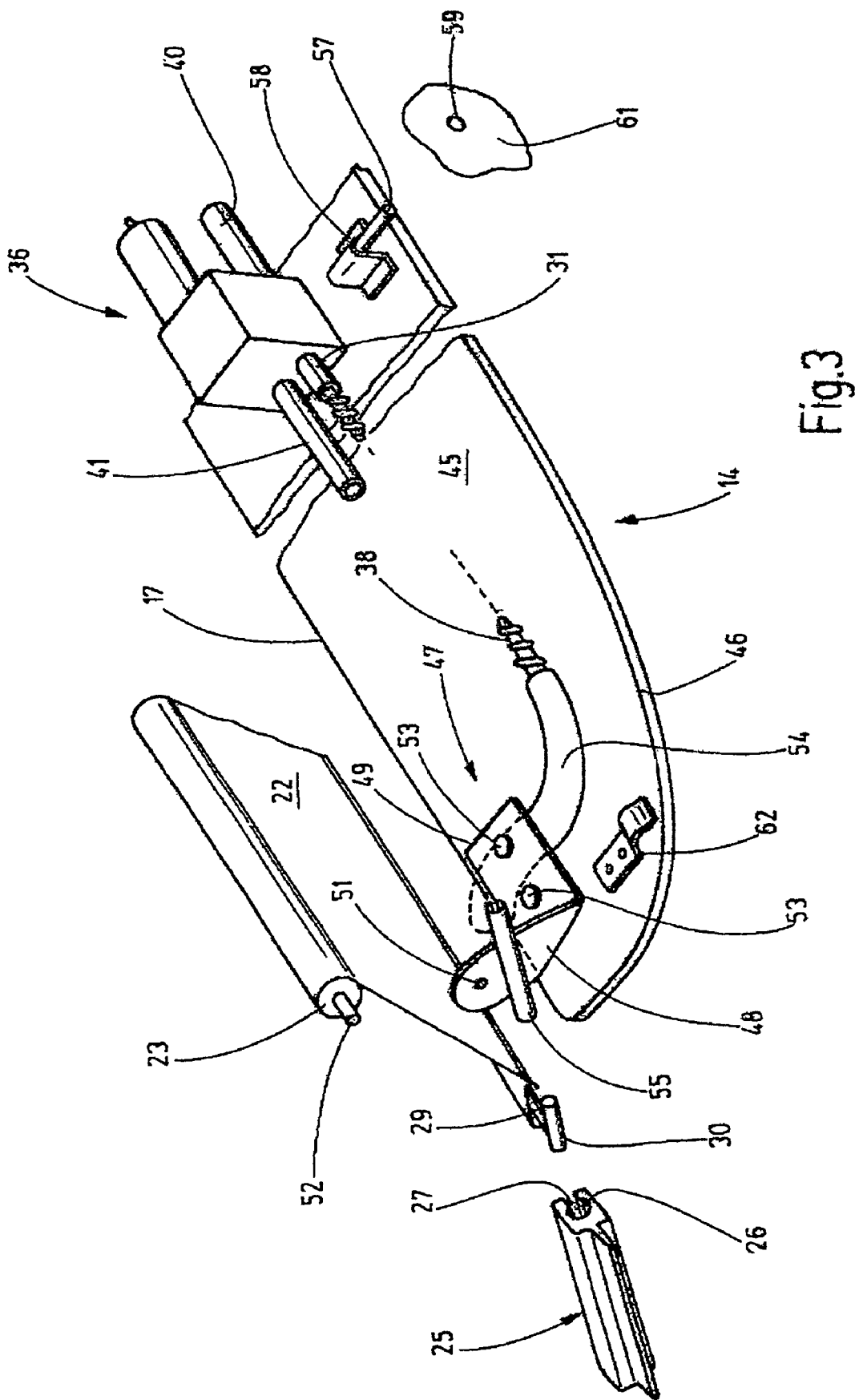
FIGS. 3-7 are exploded perspective of alternative embodiments of non-metallic back-seat shelf halves for supporting a roller blind in accordance with the invention.

According to a first embodiment of the invention, as shown in FIG. 3, the back-seat shelf half 14 is made from a wood material, for example, hard particle board or an especially hardened paperboard construction. The main components are wood fibers bonded to each other by a suitable bonding agent. The bonding agent can be a resin or a lignin. The resulting back-seat shelf half 14 has an extremely small temperature coefficient.

In FIG. 3 a right section of the back-seat shelf half 14 is shown in perspective from a bottom side and in a partially exploded fashion. The back-seat shelf half 14 hence has a top side pointing away from the viewer and a bottom side 45 facing the viewer. It is bordered at the front by a straight edge forming the slot edge 17 and a rear edge 46, which corresponds to the contours of the interior at the height of the back-seat shelf 12 in the region of the bottom edge of the rear window 5 from a C-pillar up to the other C-pillar.

The back-seat shelf half 14 is shown in FIG. 3 as a flat component in order not to confuse the drawing with details that are not essential for understanding the invention. Actually, however, the back-seat shelf 14 is structured more or less rigidly and also contains, for example, air outlet slots arranged in the region of the rear edge 46 and also other structural measures for connecting to the front half 15 of the back-seat shelf. In particular, on the bottom side of the back-seat shelf half 14 there are structural elements which make the back-seat shelf half 14 sufficiently resistant to bending with respect to its longitudinal extent relative, which is transverse to the length of the vehicle so that the back-seat shelf half 14 does not bend significantly due to loading from the top.

The wind-up shaft 23 is supported between two bearing devices 47 which are arranged mirror-symmetrically with respect to each other in the region of the ends of the back-seat shelf half 14. Because the two bearing devices 47 are mirror-symmetric relative to each other, it is sufficient to explain only one of the two bearing devices in detail.

The bearing device 47 may be a plastic molded part or a steel bent part which forms a leg 48 projecting from the bottom side 45 and also a leg 49 arranged on the bottom side 45. The leg 48 contains a bearing borehole 51 for holding an axle journal 52 of the wind-up shaft 23. The leg 49 of the bearing device 47 is connected, for example, by means of screws or rivets 53, rigidly and immovably to the back-seat shelf half 14. The opening 51 in the other bearing arrangement 47 is appropriately shaped so that it can form an abutment for the spring motor 24.

The gear motor 36 from which the guide tubes 32 or 31 and storage tubes 40, 41 extend on both sides is mounted somewhat in the middle of the back-seat shelf half 14 with respect to its longitudinal extent. As previously indicated, the associated linear push element 38 is guided in the guide tube 41 so that it is protected from buckling. In an end region at 54, as depicted in FIG. 3, the guide tube 31 is shaped like a resiliently flexible hose. With its free end, the elastic section 54 is placed on a coupling piece 55, which is attached rigidly to the outside of the leg 48. The coupling piece 55 is used to connect the guide tube 31 to the guide rail 19 or 25. The coupling piece 25 is tubular and is provided, at least on the end away from the viewer, that is, in the region in which it runs over the edge 17, with a slot that allows the passage of the throat part 29 of the guide part 28. The open width of the coupling piece 55 is dimensioned so that the slide 30 can slide with sufficient play in the coupling piece 55.

For centering the back-seat shelf half 14 in the car body, a centering pin 57, which sits in a corresponding receptacle 58 attached to the bottom side 45, is provided on its bottom side 45 approximately in the middle of the back-seat shelf half 14. The centering pin 57 interacts with an opening 59 in the car body, from which a section 61 is shown schematically in FIG. 3. On the bottom side 45 of the back-seat shelf half 14 spring hooks 62 are provided which have corresponding mounting flanges secured to the back-seat shelf half 14 adjacent the edge. With the aid of the spring hooks 62, the back-seat shelf half 14 is prevented from rising.

Before assembly in the vehicle, the roller blind 20 can be completely preassembled together with the back-seat shelf half 14. After preassembly, the slides are placed, each individually, in the associated coupling piece 55, wherein the throat part 29 contacts the edge of the leg 48 facing away from the viewer. The installed spring motor 24 keeps the arrangement in tension.

The back-seat shelf half 14 thus can be delivered together with the parts of the roller blind 20 installed therein to the assembly line for the vehicle. On the assembly line, the back-seat shelf half is assembled, wherein the coupling parts 55 are simultaneously inserted on both ends of the back-seat shelf half 14 into the associated guide rail 19 or 25. The guide rails 19, 25 can be separate rails made from an aluminum extruded profile, as shown schematically in FIG. 3, or plastic rails, or they can be integral components of the side lining of the C-pillar.

After assembly, the roller blind 20 functions as explained above.

Figure 4:
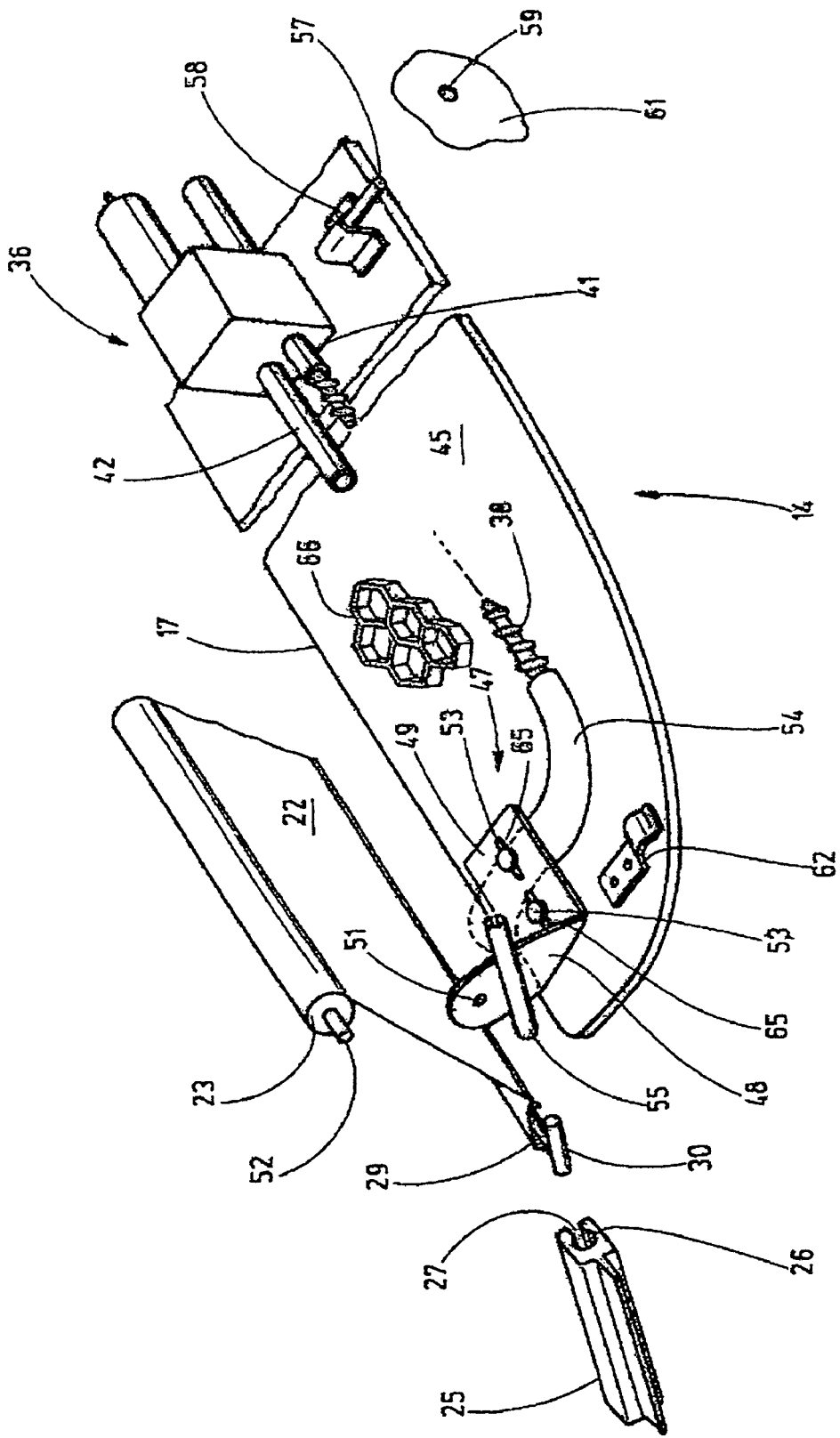

FIG. 4 shows another embodiment in which the back-seat shelf half 14 is made from a plastic that has a large temperature coefficient as compared to steel. The back-seat shelf half 14 can be made from a strip-shaped pre-formed or injection molded plastic. To effect the large temperature coefficient, a number of changes are required to the above embodiment. The following description is limited to the modifications necessary for understanding, this embodiment of the invention, with similar reference numbers being used for similar components that recur in FIG. 4.

To effect the larger temperature coefficients and the associated greater change in lengths in the embodiment of FIG. 4, the two bearing devices 47 are movably mounted on the bottom side 45. In this case, the leg 49 is formed, for example, with two elongated holes 65 which extend with their longitudinal axes parallel to the slot edge 17. The screws or rivets 53 extend through these holes to enable the leg 49 to move in the direction parallel to the slot 17, while securing the bearing sleeve with sufficient force to prevent rattling against the bottom side 45. Thus, it becomes possible to keep the distance sufficiently constant between the two bearing devices 47 independently of the thermal change in length of the back-seat shelf half 14.

In this case, the car body is used as a spacer. The distance between the two bearing devices 47 is maintained with the aid of the two guide rails 19,25, which are rigidly anchored in the car body and which are connected with sufficient rigidity, on the other side, to the associated bearing device 47 by means of the stiff coupling piece 55. Through this rigid and stiff mechanical connection between the car body and the bearing device 47 by means of the guide rails and the coupling parts 55, the centering of the wind-up shaft 23 between the bearing devices 47 also remains temperature-independent. No other measures are required for keeping the arrangement functional.

In order to prevent the back-seat shelf half 14 from gradually moving to one side of the vehicle side due to the fluctuating length of the back-seat shelf half 14 and frictional contact of the leg 49 on the bottom side 45, a contact of centering pin 57 again is provided. Due to the large difference in length that can occur depending on the temperature, a gap on the order of 10 mm can be created on one side of the vehicle. To distribute this gap symmetrically on both sides, the centering pin 57 is provided, which is arranged approximately in the middle with respect to the longitudinal length of the back-seat shelf half 14. It extends, as described, into the car body-fixed borehole 59 so that, in this way, the middle of the back-seat shelf half 14 is fixed. The temperature-dependent changes in length thus necessarily act on both sides in the same way.

In order not to hinder the expansion of length, the hooks or brackets 62 again are provided, which form, with the bottom side 45 of the back-seat shelf half 14, a mouth that is open toward the back of the vehicle and which also can move laterally with respect to the car body retention flange.

For increasing the resistance to bending of the back-seat shelf half 14, on the bottom side 45 there can be ribs 66 which surround hexagonal cells producing a honeycomb pattern.

Figure 5:
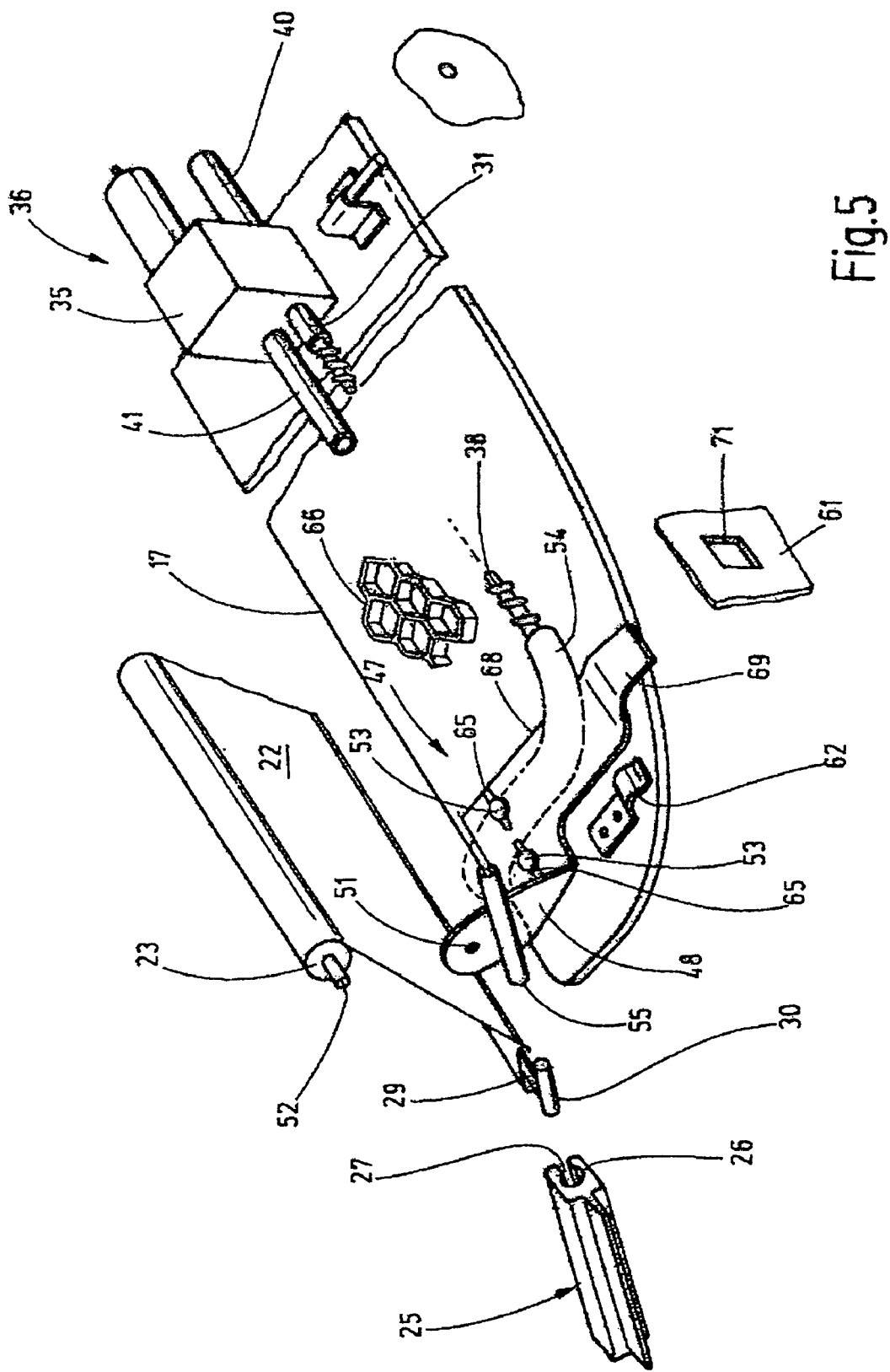

If the strength of the guide rails 19, 25 is not sufficient to guarantee the desired distance between the bearing devices 47, for example, because the guide rails 19, 25 are plastic molded parts or injection-molded parts which are attached to the side lining, the embodiment as shown in FIG. 5 can be used. This embodiment differs from that of FIG. 4 by virtue of another bracket 68 which ends in a tongue 69. The bracket 68 is rigidly connected, for example, to the leg 49 connected to the bottom side 45 in the manner described above in connection with FIG. 4.

The tongue 69 is provided for engaging a corresponding opening 71 in the car body 61. The tongue 69 engages the opening with sufficient freedom from play with respect to the direction parallel to the longitudinal length of the edge 17. Thus, with the assistance of the car body, the distance and the centering of the two bearing devices 47 with respect to the car body are guaranteed, independent of whether the back-seat shelf half 14 made from plastic contracts at lower temperatures or expands at higher temperatures. The centering of the back-seat shelf half 14 itself is guaranteed with the aid of the centering pin 57, which is located in the middle of the back-seat shelf half 14.

Figure 6:
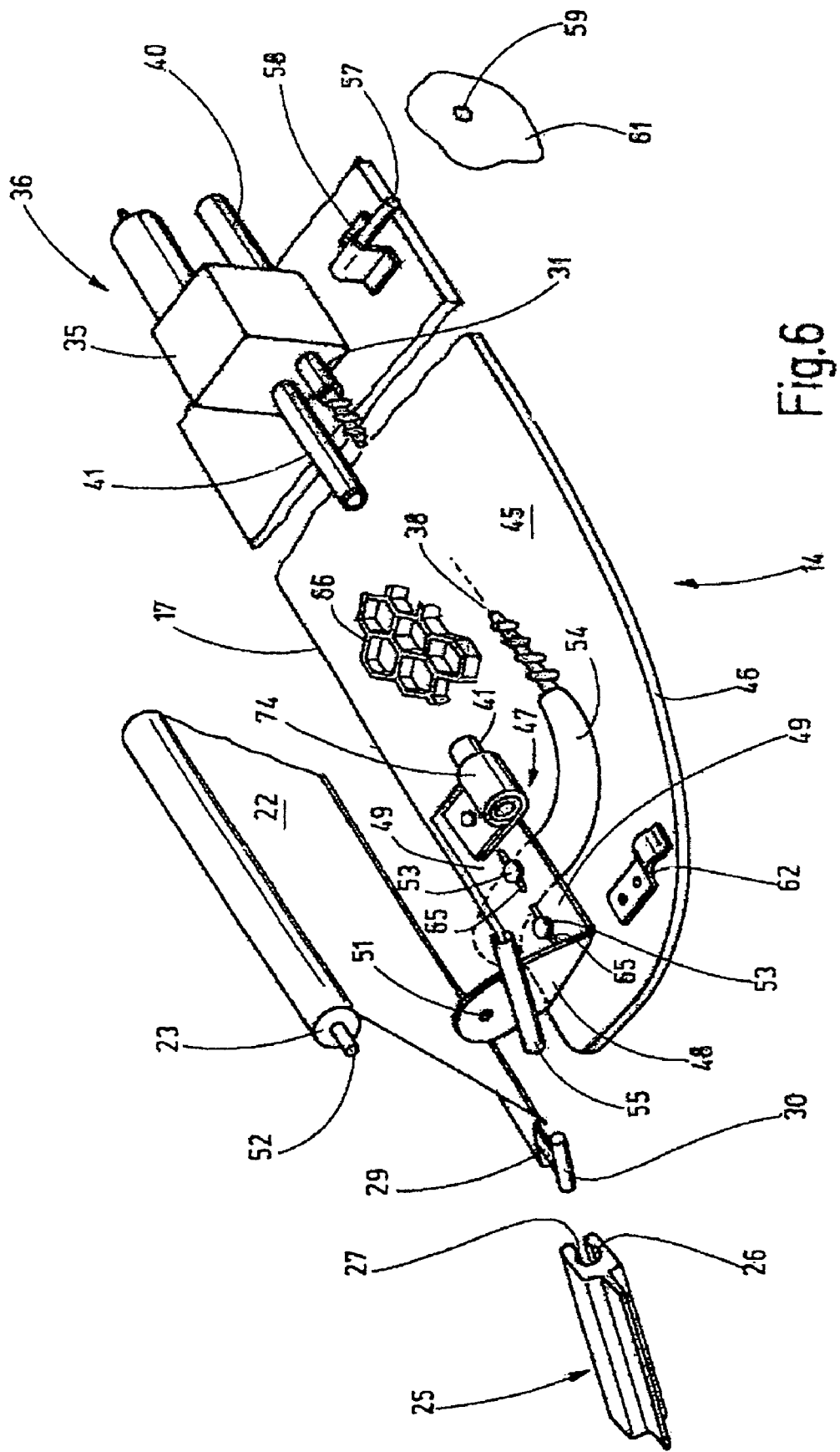

In the embodiment according to FIG. 6, the back-seat shelf half 14 is made from a plastic material with a large temperature coefficient, as in the embodiments according to FIGS. 4-5. However, instead of using the car body of the vehicle as a spacer, in the embodiment according to FIG. 6, the storage tubes 40,41 are used. The storage tubes 40,41 are made of metal, for example, aluminum. The coefficient of thermal expansion of aluminum is significantly greater than that of steel, but not so very different that clearly visible differences in length, which could lead to the roll-up shade 22 becoming uncentered in the vehicle. In this instance, length changes in the order of 500 mm can occur.

In this arrangement, for example, the storage tube 41 is connected rigidly and immovably to the gear housing 35. The free end of the storage tube 41 is inserted in a shell 74, which is immovably connected to the leg 49 of the bearing device 47. The same applies for the construction and attachment of the storage tube 40. Because the gear housing 45 of the gear motor 36 is located in the middle of the back-seat shelf half 14 with respect to its longitudinal length and thus at the height of the centering pin 57, the storage tubes 40, 41 force a constant distance of each bearing device 47 from each other and from the centering pin 57, independently of how the length of the back-seat shelf half changes due to its temperature profile. Even if the storage tubes 40, 41 run slightly offset for spatial reasons, the force coming from the offset tubes is always sufficient to maintain the distance between the bearing devices 47 and their centering with respect to the pin 57. The solution according to FIG. 6 can be used both for guide rails 19, 25, which are stiff, and also for those that are elastic and not in the position to force the correct distance between the bearing devices 47.

Figure 7:
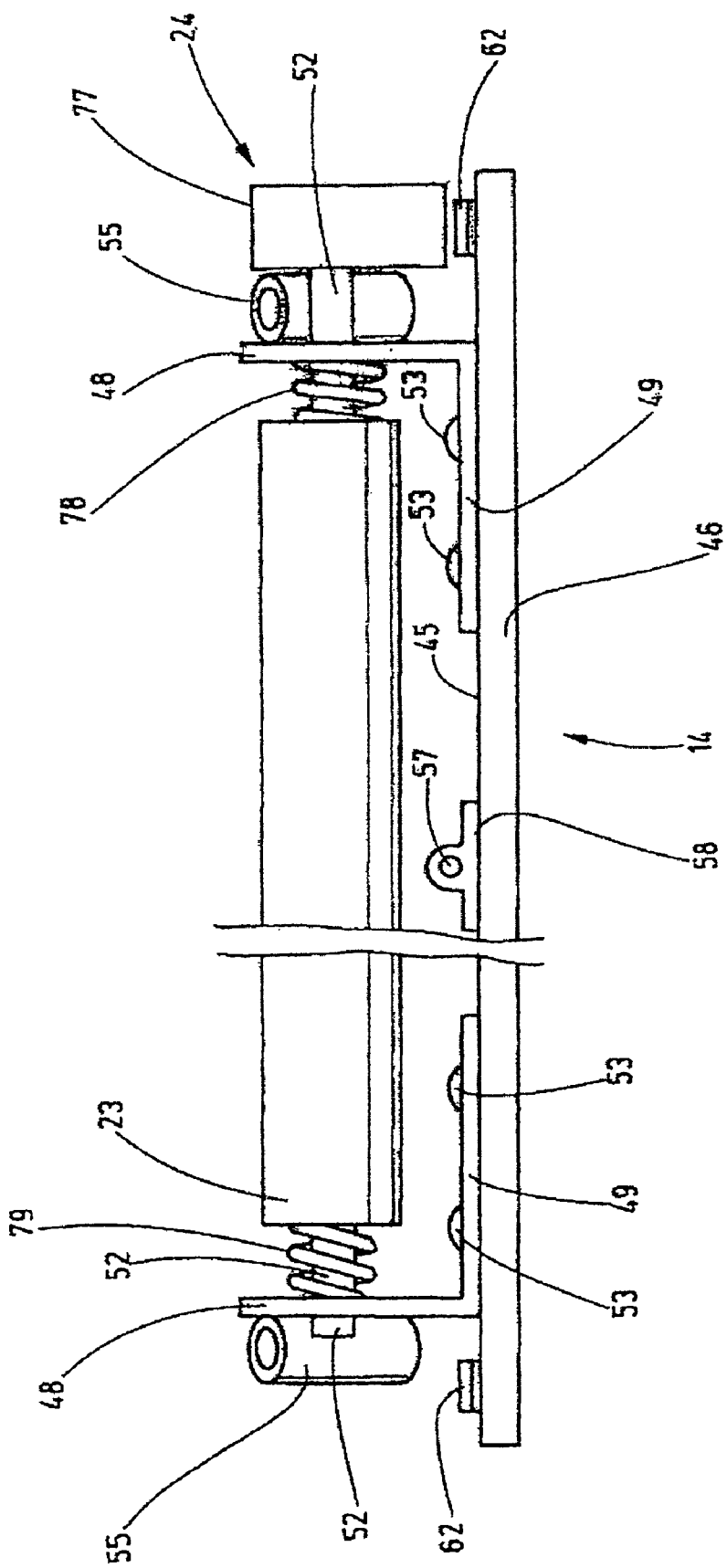

FIG. 7 shows an embodiment in which the bearing devices 47 are attached rigidly and immovably to the back-seat shelf half 14. The figure depicts a rear view on the back-seat shelf half 14, which is arranged for better understanding by comparison with the previously explained embodiments, so that the bottom side points upward. The attachment of the leg 49 is effected in the same immovable way as in the embodiment according to FIG. 3.

To effect the different temperature profiles between the back-seat shelf half 14 made from plastic and the wind-up shaft 23 made from steel, the two bearing devices 47 are arranged at a distance from each other so that the legs 48 have a greater distance from each other than that corresponding to the length of the wind-up shaft 23. Therefore, the wind-up shaft 23 can float with its bearing pin 52 between the legs 48 in the longitudinal direction.

The spring motor 24 is constructed differently from the previous embodiments. In the embodiments explained above, the spring motor 24 was a helical tensile spring located within the wind-up shaft 23. In the embodiment according to FIG. 7, the spring motor is formed by a spiral spring similar to a clockwork spring, which is located in a housing 77 attached to the back-seat shelf half 14. The coupling between the bearing journal 52, which can rotate freely in the associated leg 48, is locked in rotation with the spiral spring like the bearing pin 52 on the other side. However, the coupling is constructed so that the floating movement of the wind-up shaft 23 is not hindered by the spiral spring.

To achieve the centering, two helical compression springs 78,79 are provided, which sit between each end of the wind-up shaft 23 and the adjacent leg 48 of the bearing device 47. The middle position of the back-seat shelf half 14 made from plastic is guaranteed, as before, by the centering pin 57 arranged in the middle.

In this embodiment, when the length of the back-seat shelf half 14 changes, at lower temperatures the legs 48 move toward each other and at higher temperatures with the expanding back-seat shelf half 14, they move away from each other. Despite this relative movement, since the back-seat shelf half is positioned or centered by the centering pin 57 with respect to the car body, the wind-up shaft 23 is arranged centrally because the helical compression springs 78, 79 push the wind-up shaft 23 with equal force until a balanced state is reached between the springs, which corresponds to the centered position between the two bearing devices 47.

For compensating the temperature-dependent relative movement of the bearing devices 47 with respect to the car body, it is necessary to use guide rails 19, 25, which can receive this movement at least in the bottom section in the vicinity of the back-seat shelf 12. For this purpose, guide rails 19, 25 can be used which are sufficiently elastically flexible in the bottom region.

Figure 8:
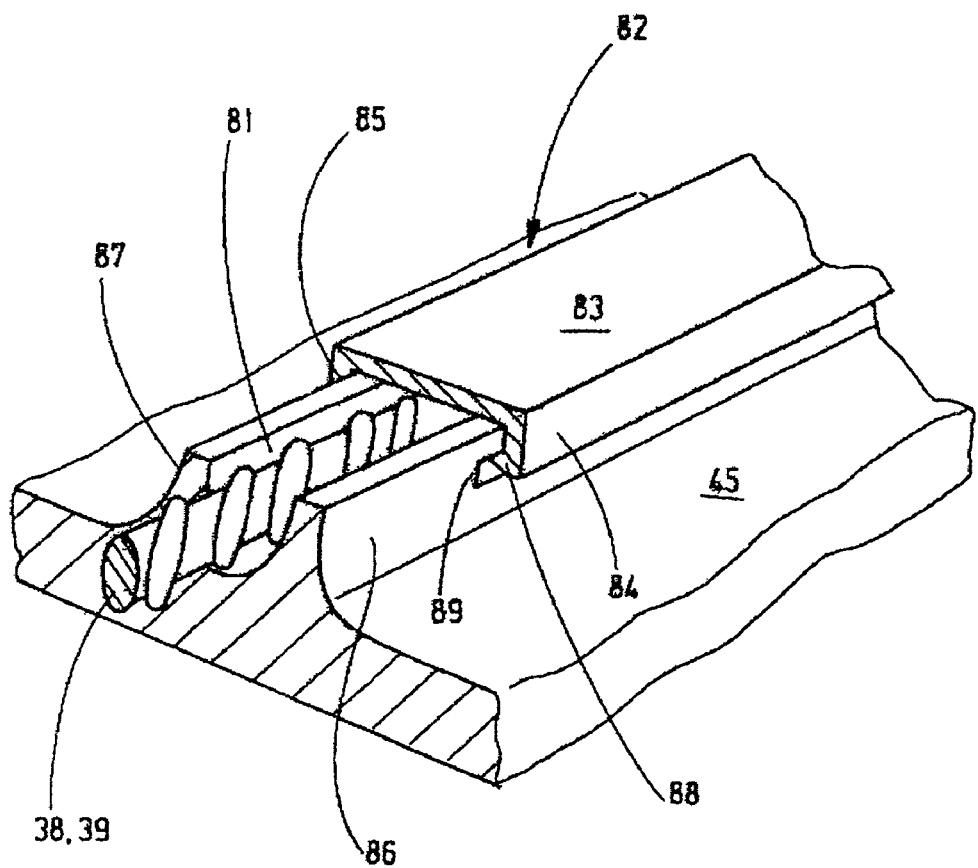
FIG. 8 is a fragmentary perspective of an alternative embodiment of back-seat shelf half having a storage tube retention feature that can be used with the back-seat shelf halves shown in the embodiments of FIGS. 3-7.

FIG. 8 shows an additional structuring of the bottom side 45 of the back-seat shelf half 14 that can be alternatively used in each of the embodiments of FIGS. 3-7. On the bottom side 45, an additional groove 81 is formed, which emerges from the geared motor 36 and aligns with the borehole, by means of which a slack length or strand of the corresponding push element emerges. The groove 81 is used as a storage tube for the slack length of each push element 38, 39. To prevent buckling or falling, an additional elongated cover 82 is provided, which has a U-shaped construction. With its back 83, the cover 82 closes the groove 81, while its legs 84,85 overlap laterally projecting walls 86,87, which define the groove 81. On the inside of the legs 84, 85, hooks 88 spaced apart from each other engage in corresponding openings 89 in the side walls 86,87, in order to lock the cover 82. The arrangement according to FIG. 8 spares the installation of separate storage tubes. It is understood that this arrangement is not applicable to the embodiment according to FIG. 6.

From the foregoing, it can be seen that in a rear-window roller blind, a rear half of the back-seat shelf, which is located between the rear window and the pull-out slot for the rear-window roller blind, is used as a support element. The back-seat shelf half is made either from a wood material or a plastic molded part. Through special measures, it is ensured that the temperature profile is compensated.

The invention claimed is:

1. In a motor vehicle comprising a car body made of metal having a back seat and a rear window,
   a rear-window roller blind,
   a back-seat shelf (12) fixedly mounted between said back seat and rear window (5), said back-seat shelf (12) having a front region and a rear region (14, 15) adjacent the rear window, said front and rear regions (44,45) defining a pull-out slot (13) extending over the length of the back-seat shelf,
   said rear region (14) of the back-seat shelf being formed by a carrier element (14), made from a plastic having a greater temperature coefficient of expansion than the metal from which the car body is made,
   a pair of bearing devices (47) mounted on said carrier element (14) for relative movement in a direction parallel to the pull-out slot,
   at least one spacer element (61; 40,41) for maintaining the distance between the bearing devices (47) independent of changes in temperature and differences in temperature coefficients of expansion between the car body and carrier element (14),
   said rear window roller blind including a wind-up shaft (23) connected to the carrier element (14) by means of said bearing devices (47),
   a roll-up shade (22) having one edge attached to the wind-up shaft (23) and an opposite edge away from the wind-up shaft (23) is connected to a pull rod (21) which carries slides (30) on its ends,
   two guide rails (19, 25) mounted in the motor vehicle which begin at the back-seat shelf (12) and in which the slides (30) of the pull rod (21) are movable by linear push elements (38, 39) which are guided in said guide rails so that they are protected from buckling,
   a spring motor (24) coupled to said wind-up shaft (23) for biasing the roll-up shade (22) in a direction for winding onto the wind-up shaft (23), and
   a gear motor (36) mounted on the carrier element (14) for moving said linear push elements (38, 39) in motion in sync and in opposite directions.

2. In the motor vehicle of claim 1 in which each said bearing device (47) includes a tubular coupling part (55) connected to a respective one of said guide rails (19,25) within which movement of a respective slide (30) is guided.

3. In the motor vehicle of claim 2 including guide tubes (31,32) having at least some elastic section extending between said gear motor (36) and a respective coupling part (55) for guiding movement of a respective push element (38,39).

4. In the motor vehicle of claim 1 in which said at least one spacer element includes guide tubes (31,32) rigidly connected between said gear motor (36) and a respective bearing device (47).

5. In the motor vehicle of claim 1 in which said at least one spacer element is formed by the car body (61).

6. In the motor vehicle of claim 1 in which said bearing devices are shiftably movable on said carrier element due to forces from connecting means (19,25,55; 69,71) connected between the bearing devices (47) and the car body (61).

7. In the motor vehicle of claim 6 in which said connecting means is formed by a coupling device (55) for the guide rails (19,25).

8. In the motor vehicle of claim 7 in which the coupling device is connected to the bearing device by a pin (69) or an eye.

9. In the motor vehicle of claim 7 in which said coupling device is connected to the car body by a pin or eye (71).

10. In the motor vehicle of claim 1 in which said carrier element (14) has a centering means (59) with respect to its longitudinal length which interacts with a centering means (59) on the car body at a height of the wind-up shaft (23).

11. In the motor vehicle of claim 1 in which said gear motor (36) is mounted on the carrier element (14) centrally with respect to the longitudinal length of the carrier element (14) at the height of the wind-up shaft (23).

12. In the motor vehicle of claim 1 in which said carrier element (14) has honeycomb like ribs (66) forming hexagonal cells on its bottom side (45).

13. In the motor vehicle of claim 1 in which said carrier element (14) has at least one groove (81) on its bottom side (45) for holding a push element (38,39).

14. The motor vehicle of claim 1 in which said windup shaft is made of steel, and said carrier element is made from a plastic having a greater temperature coefficient of expansion than the steel from which the windup shaft is made.

15. The motor vehicle of claim 1 in which the metal from which the car body is made is steel.

16. In a motor vehicle comprising a car body made of metal having a back seat and a rear window,
    a rear-window roller blind,
    a back-seat shelf (12) fixedly mounted between said back seat and rear window (5), said back-seat shelf (12) having a front region and a rear region (14, 15) adjacent the rear window, said front and rear regions (44,45) defining a pull-out slot (13) extending over the length of the back-seat shelf,
    said rear region (14) of the back-seat shelf being formed by a carrier element (14) made from a plastic having a greater temperature coefficient of expansion than the metal for which the car body is made,
    a pair of bearing devices (47) mounted on said carrier element (14) for relative movement in a direction parallel to the pull-out slot,
    at least one spacer element (61; 40,41) for maintaining the distance between the bearing devices (47) independent of changes in temperature and differences in temperature coefficients of expansion between the car body and carrier element (14),
    said rear window roller blind including a wind-up shaft (23) connected to the carrier element (14) by means of said bearing devices (47),
    a roll-up shade (22) having one edge attached to the wind-up shaft (23) and an opposite edge away from the wind-up shaft (23) is connected to a pull rod (21) which carries slides (30) on its ends,
    elastic equalizing elements (78,79) for centering the wind-up shaft (23) between the bearing devices (47),
    two guide rails (19, 25) mounted in the motor vehicle which begin at the back-seat shelf (12) and in which the slides (30) of the pull rod (21) are movable by linear push elements (38, 39) which are guided in said guide rails so that they are protected from buckling, a spring motor (24) coupled to said wind-up shaft (23) for biasing the roll-up shade (22) in a direction for winding onto the wind-up shaft (23), and a gear motor (36) mounted on the carrier element (14) for moving said linear push elements (38, 39) in motion in sync and in opposite directions.

17. In the motor vehicle of claim 16 in which each said bearing device (47) includes a tubular coupling part (55) connected to a respective one of said guide rails (19,25) within which movement of a respective slide (30) is guided.

18. In the motor vehicle of claim 16 in which each guide rail (19,25) has a section adjacent a respective bearing device which is movable in a plane through the axis of the wind-up shaft (23).

19. In the motor vehicle of claim 16 including guide tubes (31,32) having at least some elastic section extending between said gear motor (36) and a respective coupling part (55) for guiding movement of a respective push element (38,39).

20. In the motor vehicle of claim 16 in which said carrier element (14) has a centering means (59) with respect to its longitudinal length which interacts with a centering means (59) on the car body at a height of the wind-up shaft (23).

21. In the motor vehicle of claim 16 in which said gear motor (36) is mounted on the carrier element (14) centrally with respect to the longitudinal length of the carrier element (14) at the height of the wind-up shaft (23).

22. In the motor vehicle of claim 16 including a coupling between the spring motor (24) and wind-up shaft (23) that is operable for exerting only a torsional force on the wind-up shaft (23).

23. In the motor vehicle of claim 16 in which said equalizing elements (78,79) comprise two springs, each being inserted between an end of the wind-up shaft and a respective bearing device (47).

24. In the motor vehicle of claim 16 in which said carrier element (14) has honeycomb like ribs (66) forming hexagonal cells on its bottom side (45).

25. The motor vehicle of claim 16 in which said windup shaft is made of steel, and said carrier element is made from a plastic having a greater temperature coefficient of expansion than the steel from which the windup shaft is made.

26. The motor vehicle of claim 16 in which the metal from which the car body is made is steel.

\* \* \* \* \*